United States Patent [19]
Jakubiec

[11] Patent Number: 5,934,732
[45] Date of Patent: Aug. 10, 1999

[54] LOCK MECHANISM FOR FOLDABLE VEHICLE SEAT

[75] Inventor: Steven M. Jakubiec, Bloomfield, Mich.

[73] Assignee: Chrysler Corporation, Auburn Hills, Mich.

[21] Appl. No.: 08/722,684

[22] Filed: Sep. 30, 1996

[51] Int. Cl.⁶ ........................................................ B60N 2/02
[52] U.S. Cl. .................... 296/65.01; 296/69; 296/65.09; 297/321; 297/331
[58] Field of Search ............................ 296/66, 65.1, 69, 296/63; 297/15, 129, 311, 337, 321, 322, 331, 334, 336

[56] References Cited

U.S. PATENT DOCUMENTS

| | | | |
|---|---|---|---|
| 2,926,948 | 3/1960 | Koplin et al. | 296/66 |
| 3,113,801 | 12/1963 | Caley | 296/66 |
| 3,171,682 | 3/1965 | Buser et al. | 296/66 |
| 3,703,310 | 11/1972 | Lystad | 296/10 |
| 3,973,799 | 8/1976 | Berg | 297/341 |
| 4,010,979 | 3/1977 | Fisher, III et al. | 297/379 |
| 4,206,946 | 6/1980 | Maertens | 297/379 |
| 4,227,736 | 10/1980 | Lebault et al. | 296/65 R |
| 4,268,086 | 5/1981 | Okuyama | 297/378.12 X |
| 4,518,201 | 5/1985 | Wahlmann et al. | 297/316 |
| 4,634,180 | 1/1987 | Zaveri et al. | 297/341 |
| 4,699,418 | 10/1987 | Plavetich | 296/65 R |
| 4,793,649 | 12/1988 | Yamano et al. | 296/65.1 |
| 4,805,953 | 2/1989 | Yamauchi | 296/65.1 |
| 4,957,321 | 9/1990 | Martin et al. | 296/65.1 |
| 5,195,795 | 3/1993 | Cannera et al. | 296/65.1 |
| 5,466,048 | 11/1995 | Fowler et al. | 296/69 X |
| 5,482,349 | 1/1996 | Richter et al. | 297/15 |
| 5,527,087 | 6/1996 | Takeda et al. | 297/15 |
| 5,641,202 | 6/1997 | Rus | 296/65.1 X |

Primary Examiner—D. Glenn Dayoan
Assistant Examiner—Jason Morrow
Attorney, Agent, or Firm—William J. Coughlin

[57] ABSTRACT

A rear seat assembly for a vehicle can be moved between a seating configuration and a load floor configuration without requiring the operation of release pins or knobs. The seat assembly includes a mount assembly bolted to the floor of the vehicle and a seat back pivotably engaged with the mount assembly. The seat back is formed with a lower finger. A seat cushion is movably coupled to the mount assembly, and an interlock pin is immovably formed, as by welding, to the seat cushion. The seat cushion can be pushed backwardly to a seating configuration, in which the seat cushion is juxtaposed with the seat back and the interlock pin abuts the engagement surface to hold the seat back upright. Also, the seat cushion can be rotated forwardly to distance the interlock pin from the seat back and thereby permit the seat back to be pushed downwardly into a horizontal load floor configuration.

21 Claims, 3 Drawing Sheets

LOCK MECHANISM FOR FOLDABLE VEHICLE SEAT

BACKGROUND OF THE INVENTION

1. Field of Invention

The present invention relates generally to vehicle seats, and more particularly to sport utility vehicle rear seats that fold from a seating configuration to a load floor configuration.

2. Background of the Invention

Many vehicles, particularly sport utility vehicles, are equipped with rear seats that can be moved from a seating configuration, in which passengers can sit in the seat, to a so-called "load floor" configuration, wherein the back support of the seat is folded downwardly to assume a horizontal orientation and thereby facilitate cargo stowage in the van. Typically, locking mechanisms are provided for holding the seat in the seating configuration, and the locking mechanisms can be released to permit moving the seat to the load floor configuration.

Representative of such seats is the apparatus disclosed in U.S. Pat. No. 5,482,349, which shows a relatively complicated latch and release mechanism. As is typical with existing sport utility vehicle seats, the device disclosed in the '349 patent requires an operator to manipulate one or more release knobs to move the seat. Unfortunately, the operation of such seats can be cumbersome, and in any case it is not immediately obvious to a person not already familiar with the seat how to operate the seat. As recognized by the present invention, however, it is possible to provide a sport utility vehicle seat that can assume a seating configuration and a load floor configuration, without requiring an operator to manipulate any release knobs.

Accordingly, it is an object of the present invention to provide a rear seat assembly for a utility vehicle which can be moved to a seating configuration and to a load floor configuration. Another object of the present invention is to provide a rear seat assembly for a utility vehicle which does not require a person to manipulate any release mechanisms to move the seat assembly. Still another object of the present invention is to provide a rear seat assembly for a utility vehicle in which a seat back is interlocked with a seat cushion when the assembly is in a seating configuration. Yet another object of the present invention is to provide a rear seat assembly for a utility vehicle which is easy to use and cost-effective.

SUMMARY OF THE INVENTION

A rear seat assembly is disclosed for a vehicle having a floor. The present seat assembly includes a seat cushion that defines a front edge, a rear edge, and two side edges extending therebetween. At least one interlock pin is immovably attached to one of the side edges of the seat cushion near the rear edge, and the interlock pin extends laterally away therefrom. A seat back is formed with an engagement surface, and a mount assembly is attached to the floor with the seat back pivotably engaged with the mount assembly. Moreover, the seat cushion is movably coupled to the mount assembly between a seating position, wherein the interlock pin abuts the engagement surface of the seat back to hold the seat back in an upright seating position thereby establishing a seating configuration of the seat assembly, and a load floor position, wherein the interlock pin is distanced from the engagement surface and the seat back can be manually pushed to a horizontal load floor position. Thereby, a load floor configuration of the seat assembly is established. Advantageously, a manually grippable handle is attached to the front edge of the seat cushion for rotating the seat cushion forwardly relative to the vehicle to the load floor position.

Preferably, a pivot arm couples the seat cushion to the mount assembly. Also, a pivot bar extends from one side edge of the seat cushion to the other near the front edge of the seat cushion, with the pivot arm being engaged with the pivot bar. Moreover, a torsion bar is engaged with the seat back to urge the seat back toward the seating position.

In addition to the structure discussed above, a stop pin preferably is immovably engaged with the mount assembly. Per the present invention, the stop pin extends laterally away from the mount assembly. A stop surface that is formed on the seat back abuts the stop pin when the seat back is in the seating position to thereby prevent moving the seat back away from the load floor position beyond the seating position.

As intended by the present invention, the abutment and stop surfaces establish a bight, and the pins are received in the bight when the seat assembly is in the seating configuration. Thereby, the seat assembly is held in the seating configuration. In a preferred embodiment, the engagement surface is an outer engagement surface, and the assembly further includes an inner engagement surface parallel to and inboard from the outer engagement surface. A vehicle that incorporates the seat assembly is also disclosed.

In another aspect of the present invention, a seat assembly includes a mount assembly, a seat cushion movably coupled to the mount assembly, and a seat back pivotably coupled to the mount assembly. In accordance with the present invention, the seat assembly is movable to a seating configuration, wherein the seat cushion is orthogonally juxtaposed with the seat back and the seat cushion locks the seat back in an upright seating position. As disclosed in detail below, however, the seat cushion includes a front edge handle that is manipulable by a person to rotate the seat cushion forwardly away from the seat back to a load floor position and thereby unlock the seat back. Consequently, the seat back can be pushed by a person into a horizontal load floor position to establish a load floor configuration of the seat assembly.

The details of the present invention, both as to its structure and operation, can best be understood in reference to the accompanying drawings, in which like reference numerals refer to like parts.

DETAILED DESCRIPTION OF THE INVENTION

Figure 1:
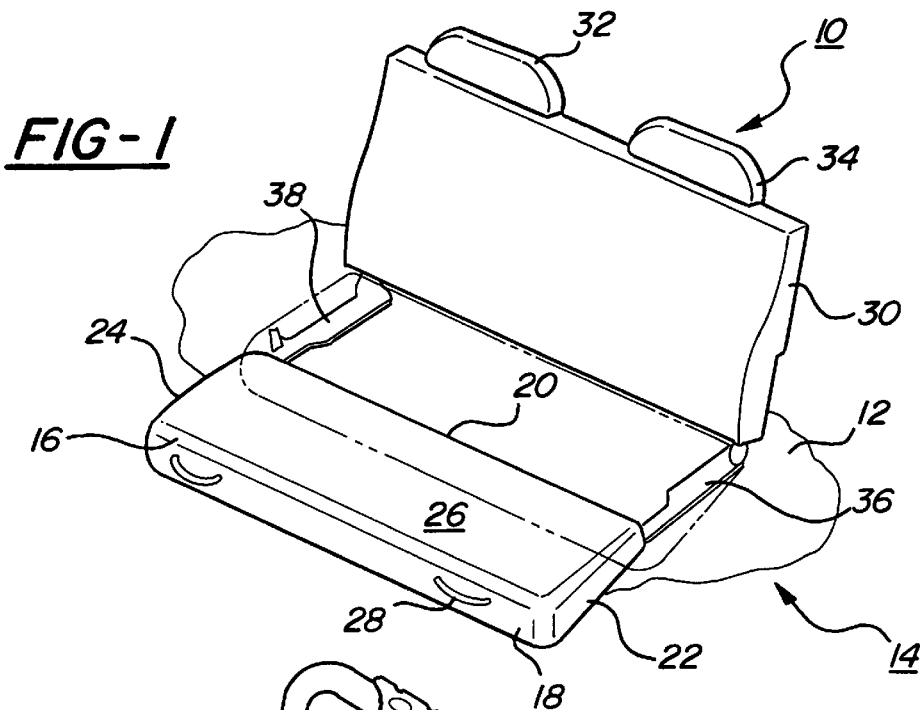
FIG. 1 is a perspective view of the seat assembly of the present invention with portions of the vehicle broken away for clarity, showing in solid lines the seat cushion moved translationally forward into its load floor position and showing in phantom the seat cushion in its seating position.

Referring initially to FIG. 1, a seat assembly is shown, generally designated 10, in operative engagement with a floor 12 of a vehicle, generally designated 14. In the preferred embodiment, the vehicle 14 is a sport utility vehicle, a light truck, a Jeep® brand vehicle made by Chrysler Corp. of Auburn Hills, Mich., or other utility vehicle.

As shown in FIG. 1, the seat assembly 10 includes a seat cushion 16 defining a front edge 18, a rear edge 20, and two side edges 22, 24 extending therebetween. Also, the seat cushion 16 can include a vehicular seat pad 26, with one or more manually grippable handles 28 being attached to the pad 26 at the front edge 18 of the seat cushion 16.

As intended by the present invention, a person can pull one of the handles 28 to rotate the seat cushion 16 forwardly relative to the vehicle 14 to a load floor position, shown in solid lines in FIG. 1. Also, a person can rotate the seat cushion 16 rearwardly from the load floor position to a seating position, shown in phantom in FIG. 1.

FIG. 1 shows that the seat assembly 10 also includes a seat back 30 having passenger head rests 32, 34. Additionally, the seat assembly 10 includes left and right mount assemblies 36, 38 that are fixedly attached, preferably by bolting, to the floor 12 of the vehicle 14. As more fully disclosed below, the seat back 30 is pivotably engaged with the mount assemblies 36, 38 for movement to the seating configuration shown in FIG. 1, wherein the seat back 30 is upright and the seat cushion 16 (when in the seating position) is orthogonally juxtaposed with the seat back 30. When both the seat cushion 16 and seat back 30 are in their respective seating positions, a seating configuration of the seat assembly 10 is established, and the seat cushion 16 locks the seat back 30 into the seating position.

As also discussed further below, the seat cushion 16 can be rotated forwardly to its load floor position, thereby unlocking the seat back 30 and permitting the seat back 30 to be manually pushed downwardly to a load floor position. In the load floor position, the seat back 30 assumes a horizontal orientation and a load floor configuration of the seat assembly 10 is established. Importantly, the above manipulations of the seat assembly 10 are accomplished without requiring the operation of release/lock knobs and operators, and require only the above-discussed manipulation of the handles 28 and seat back 30.

Figure 2:
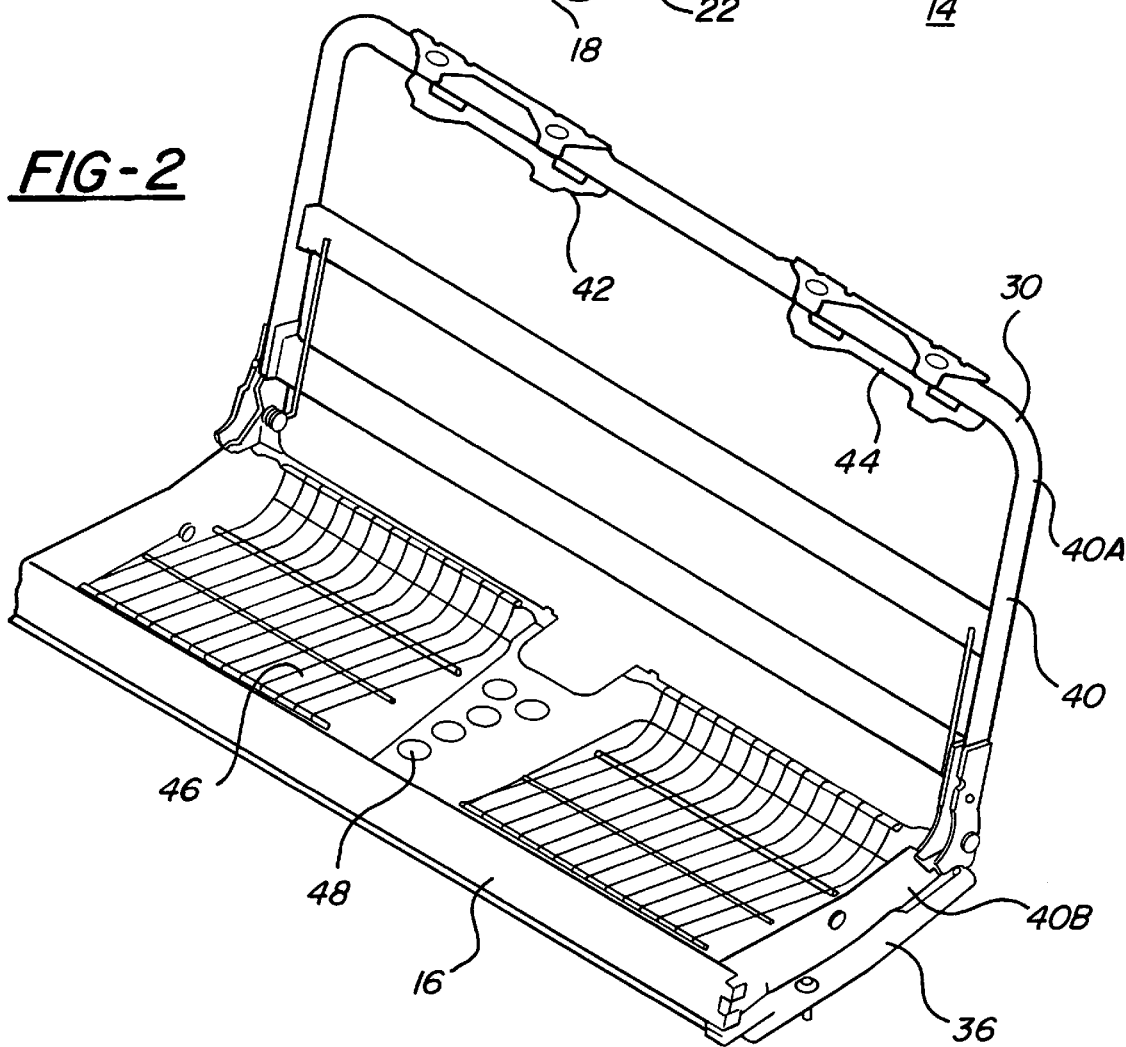
FIG. 2 is a perspective view of the seat assembly with the back support cushion and seat cushion removed.

FIG. 2 shows that the seat assembly 10 includes a seat frame 40 having a seat back frame 40A and a seat cushion frame 40B. As shown in FIG. 2, the seat back frame 40A includes head rest supports 42, 44 and resilient seat cushion springs 46. If desired, cutout cavities 48 can be formed in the frame 40 to lighten the weight of the frame 40. It is to be understood that while FIGS. 1 and 2 show a bench seat configuration of the seat assembly 10, the principles of the present invention apply equally to a bucket seat configuration.

The details of the present invention can be appreciated in cross-reference to FIGS. 3A, 3B, 3C, and 4. For clarity of disclosure, only the left mounting assembly 36 and cooperating seat assembly 10 structure will be discussed, but it is to be understood that the right mounting assembly 38 with corresponding structure are substantially identical in configuration and operation.

Figure 3A:
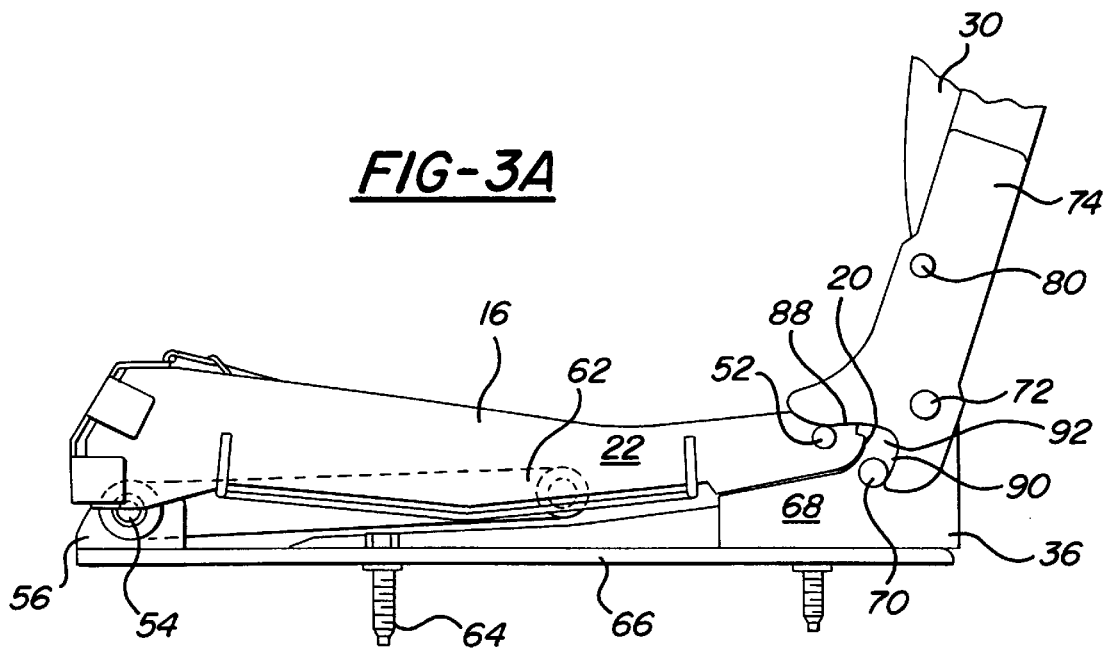
FIG. 3A is a side elevational view of the seat assembly in the seating configuration, with portions broken away.
Figure 4:
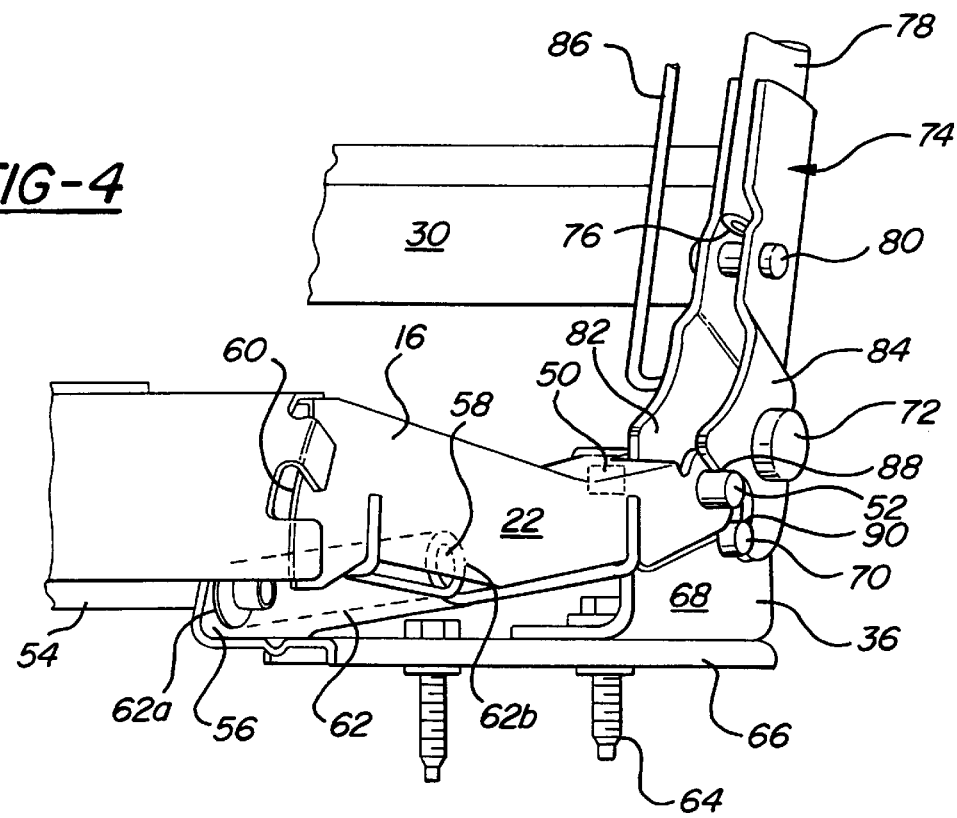
FIG. 4 is a perspective view of the engagement mechanism of the present invention, with portions of the seat assembly broken away.

As shown in cross-reference to FIGS. 3A and 4, at least one and preferably inner and outer rigid metal interlock pins 50, 52 are immovably attached to the left side edge 22 of the seat cushion 16 near the rear edge 20. The interlock pins can advantageously be welded to the seat cushion 16. In any case, as intended by the present invention the pins 50, 52 are immovable in that neither can be moved easily by hand, in contrast to release and locking devices which require user manipulation. Each interlock pin 50, 52 extends laterally away from the left side edge 22; the inner pin 50 extending laterally inwardly relative to the seat assembly 10 and the outer pin 52 extending laterally outwardly.

An elongated cylindrical solid or hollow metal torque tube 54 extends from the left side edge 22 of the seat cushion 16 to the right side edge 24 near the front edge 18 of the seat cushion 16. The torque tube 54 is attached to left and right vertical front bar brackets (only the left bar bracket 56 shown) of the left mounting assembly 36. Also, a cylindrical left pivot pin 58 is attached to the left side edge 22 of the seat cushion 16 on an inner surface 60 thereof.

As shown in FIGS. 3A and 4, a rigid elongated metal left pivot arm 62 couples the seat cushion 16 to the mount assembly 36. More specifically, the pivot arm 62 is rotatably engaged with both the torque tube 54 and the pivot pin 58 near the ends 62a, 62b of the pivot arm 62. With this combination of structure, the seat cushion 16 can be rotated forwardly and upwardly from the seating position shown in FIG. 3A toward an intermediate position shown in FIG. 3B. Continued rotation of the seat cushion 16 moves the seat cushion 16 to the load floor position shown in FIG. 3C, in which the pivot arm 62 has rotated about 180° from the seating position and in which the seat cushion 16 is displaced forwardly from the seating position.

Continuing with the description of FIGS. 3A and 4, and in particular with the description of the left mounting assembly 36, a plurality of bolts 64 hold a bottom flange 66 of the left mounting assembly 36 against the floor 12 of the vehicle 14. Further, a rear vertical flange 68 is welded to the bottom flange 66 as shown, and inner and outer opposed rigid metal stop pins (only the outer stop pin 70 shown) are formed on or welded to the rear flange 68. Moreover, a back pivot pin 72 extends through the rear flange 68 and a lower left connector bracket 74 of the seat back 30. In accordance with the present invention, the back pivot pin 72 is rotatably engaged with the connector bracket 74 to thereby pivotably engage the seat back 30 with the mounting assembly 36.

With particular attention now to the seat back 30, the connector bracket 74 is formed with a channel 76 configured for engaging a cylindrical frame bar 78 of the seat back 30. If desired, a support pin 80 can extend through the connector bracket 74 across the channel 76, just below the frame bar 78.

As shown best in FIG. 4, the connector bracket 74 is established by inner and outer fingers 82, 84 which are mirror images of each other. A trim wire 86 is coupled to the seat back 30 as shown in accordance with well-known principles to support seat fabric.

Importantly to the present invention, the outer finger 84 is formed with an engagement surface 88 and a stop surface 90. It is to be understood that the inner finger 82 is likewise formed with a respective engagement surface and stop surface (not shown), with the respective inner engagement surface being parallel to and inboard from the outer engagement surface. I have found that the use of two engagement surfaces and interlock pins per side more firmly holds the seat assembly 10 in the seating configuration without rocking motion between the seat cushion 16 and seat back 30, vis-a-vis a single pin/engagement surface per side. Also, the use of doubled components increases the structural rigidity of the assembly 10.

As shown best in FIG. 3A, when the seat back 30 is in the seating position, the engagement surface 88 is oriented generally horizontally, while the stop surface 90 is oriented generally vertically. And, a bight 92 is established by the surfaces 88, 90.

With the above disclosure in mind, the inventive cooperation of structure embodied in the present invention can now be appreciated. In the seating configuration of the seat assembly 10, the pins 52, 70 are received in the bight 92. Indeed, in the seating configuration, the interlock pin 52 abuts the engagement surface 88 of the seat back 30 to hold the seat back 30 in an upright seating position. On the other hand, in the seating configuration the stop pin 70 abuts the stop surface 90 to prevent the seat back 30 from being pushed away from the load floor position beyond the seating position shown.

Figure 3B:
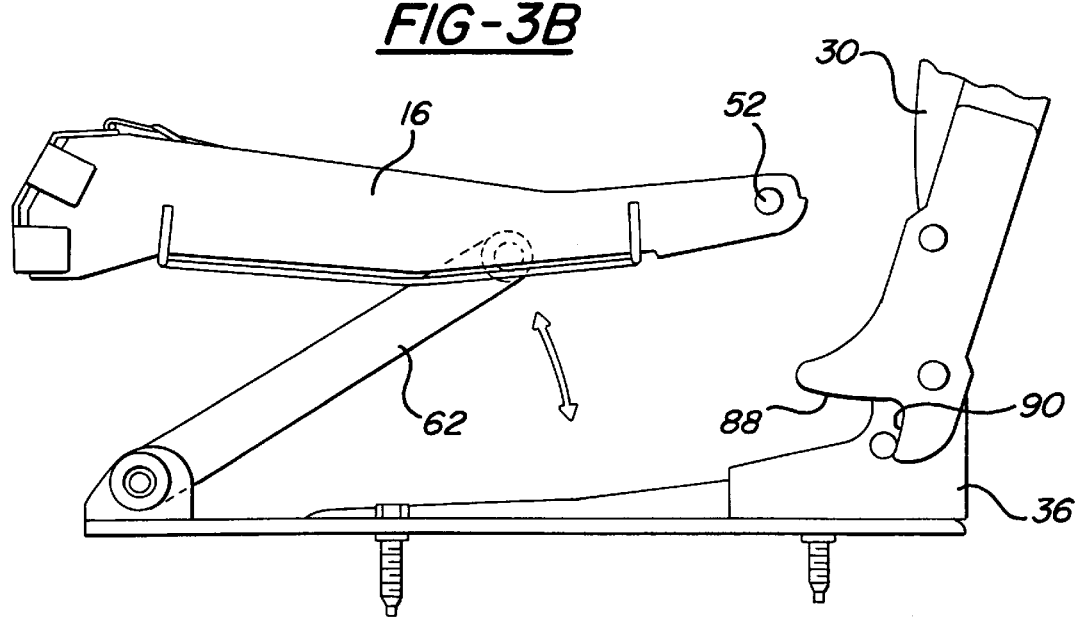
FIG. 3B is a side elevational view of the seat assembly intermediate the seating configuration and load floor configuration, with portions broken away.

When the seat cushion 16 is rotated forwardly to the position shown in FIG. 3B, the interlock pin 52 is distanced from the engagement surface 88. Thus, the seat back 30 is no longer constrained by the interlock pin 52.

Figure 3C:
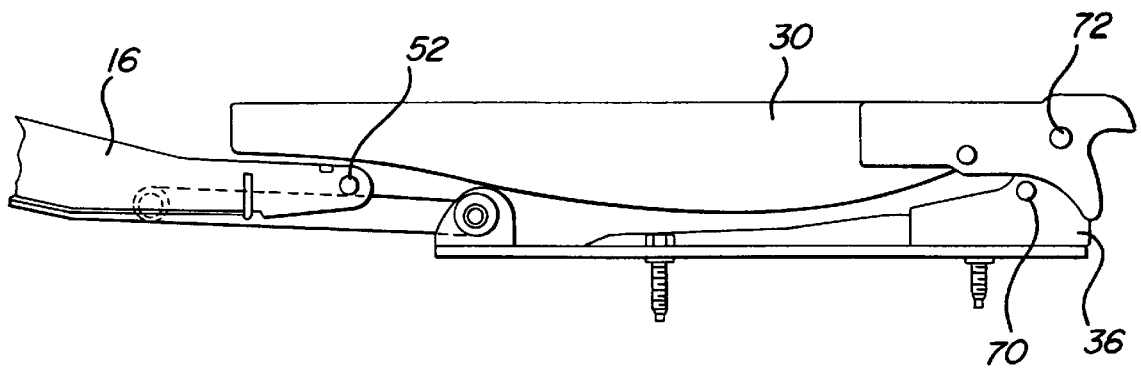
FIG. 3C is a side elevational view of the seat assembly in the load floor configuration, with portions broken away.

The seat cushion 16 is rotated further to the load floor position shown in FIG. 3C. Then, the seat back 30 can be pushed downwardly to a horizontal orientation as shown, to establish the load floor configuration of the seat assembly 10.

Accordingly, the seat assembly 10 can be moved to the seating configuration shown in FIG. 3A. In the seating configuration, the seat cushion 16 is orthogonally juxtaposed with the seat back 30, and the seat cushion 16 locks the seat back 30 in an upright seating position. Further, the seat cushion 16 includes two front edge handles 28 that are manipulable by a person to rotate the seat cushion 16 forwardly away from the seat back 30 to a load floor position and thereby unlock the seat back 30. Consequently, the seat back 30 can be pushed by a person into a horizontal load floor position to establish a load floor configuration of the seat assembly 10.

While the particular LOCK MECHANISM FOR FOLDABLE VEHICLE SEAT as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A seat assembly for a vehicle having a floor, comprising:
    a seat cushion defining a front edge, a rear edge, and two side edges extending therebetween;
    at least one interlock pin immovably attached to one of the side edges of the seat cushion near the rear edge and extending laterally away therefrom;
    a seat back formed with an engagement surface;
    a mount assembly adapted to be attached to the floor, the seat back being pivotably engaged with the mount assembly, the seat cushion being pivotably coupled to the mount assembly through a pivot arm for movement between a seating position, wherein the interlock pin abuts the engagement surface of the seat back to hold the seat back in an upright seating position thereby establishing a seating configuration of the seat assembly, and a load floor position, wherein the interlock pin is distanced from the engagement surface and the seat back can be manually pushed to a horizontal load floor position, thereby establishing a load floor configuration of the seat assembly; and
    a torque tube extending from one side edge of the seat cushion, the pivot arm being engaged with the torque tube.

2. The seat assembly of claim 1, further comprising a manually grippable handle attached to the front edge of the seat cushion for moving said seat cushion from the seating position to the load floor position.

3. The seat assembly of claim 2, further comprising a stop pin immovably engaged with the mount assembly and extending laterally away therefrom and a stop surface formed on the seat back for abutting the stop pin when the seat back is in the seating position to thereby prevent moving the seat back away from the load floor position beyond the seating position.

4. The seat assembly of claim 3, wherein the abutment and stop surfaces establish a bight, and the pins are received in the bight when the seat assembly is in the seating configuration to thereby hold the seat assembly in the seating configuration.

5. The seat assembly of claim 1, wherein the engagement surface is an outer engagement surface, and the assembly further comprises an inner engagement surface parallel to the outer engagement surface.

6. The seat assembly of claim 1, in combination with the vehicle.

7. A seat assembly having a mount assembly, a seat cushion pivotably coupled to the mount assembly, and a seat back pivotably coupled to the mount assembly, the seat assembly being movable to a seating configuration, wherein the seat cushion is orthogonally juxtaposed with the seat back and the seat cushion locks the seat back in an upright seating position, the seat cushion including a front edge handle manipulable by a person to move the seat cushion relative to the mount assembly such that the seat cushion moves forwardly away from the seat back to a load floor position and thereby unlock the seat back such that the seat back can be pushed by the person into a horizontal load floor position to establish a load floor configuration of the seat assembly.

8. The seat assembly of claim 7, further comprising:
    at least one interlock pin immovably attached to the seat cushion and extending laterally away therefrom;
    an engagement surface formed on the seat back;
    a mount assembly attached to the floor, the seat back being pivotably engaged with the mount assembly, the seat cushion being movably coupled to the mount assembly between the seating configuration, wherein the interlock pin abuts the engagement surface of the seat back to hold the seat back in the seating position, and the load floor configuration, wherein the interlock pin is distanced from the engagement surface and the seat back can be manually pushed to the load floor position.

9. The seat assembly of claim 8, further comprising a pivot arm coupling the seat cushion to the mount assembly.

10. The seat assembly of claim 9, further comprising a torque tube extending from a first side edge of the seat cushion to a second side edge of the seat cushion near a front edge of the seat cushion, the pivot arm being engaged with the torque tube.

11. The seat assembly of claim 10, further comprising a manually grippable handle attached to the front edge of the seat cushion for rotating the seat cushion forwardly relative to the vehicle to the load floor position.

12. The seat assembly of claim 11, further comprising a stop pin immovably engaged with the mount assembly and extending laterally away therefrom and a stop surface formed on the seat back for abutting the stop pin when the seat back is in the seating position to thereby prevent moving the seat back away from the load floor position beyond the seating position.

13. The seat assembly of claim 12, wherein the abutment and stop surfaces establish a bight, and the pins are received in the bight when the seat assembly is in the seating configuration to thereby hold the seat assembly in the seating configuration.

14. The seat assembly of claim 8, wherein the engagement surface is an outer engagement surface, and the assembly further comprises an inner engagement surface parallel to the outer engagement surface.

15. The seat assembly of claim 8, in combination with a vehicle.

16. A vehicle, comprising:

a floor;

a seat cushion defining a front edge, a rear edge, and two side edges extending therebetween;

at least one interlock pin immovably attached to one of the side edges of the seat cushion near the rear edge and extending laterally away therefrom;

a seat back formed with an engagement surface;

a mount assembly attached to the floor, the seat back being pivotably engaged with the mount assembly, the seat cushion being movably coupled to the mount assembly between a seating position, wherein the interlock pin abuts the engagement surface of the seat back to hold the seat back in an upright seating position thereby establishing a seating configuration of the seat assembly, and a load floor position, wherein the interlock pin is distanced from the engagement surface and the seat back can be manually pushed to a horizontal load floor position, thereby establishing a load floor configuration of the seat assembly;

a pivot arm coupling the seat cushion to the mount assembly;

a torque tube extending from one side edge of the seat cushion to the other near the front edge of the seat cushion, the pivot arm being engaged with the torque tube;

a manually grippable handle attached to the front edge of the seat cushion for moving seat cushion forwardly to the load floor position;

a stop pin immovably engaged with the mount assembly and extending laterally away therefrom; and a stop surface formed on the seat back for abutting the stop pin when the seat back is in the seating position to thereby prevent moving the seat back away from the load floor position beyond the seating position, wherein the engagement surface is an outer engagement surface, and the vehicle further comprises an inner engagement surface parallel to and inboard from the outer engagement surface.

17. A seat assembly for a vehicle having a floor, comprising:

a mount assembly adapted to be fixedly attached to the floor, a seat cushion coupled to said mount assembly for movement between a first position and a second position;

a seat back pivotally coupled to said mount assembly between a generally upright position and a generally horizontal position;

an interlock pin carried by said seat cushion, said interlock pin extending from said seat cushion and adapted to engage said seat back and prevent said seat back from rotating from said generally upright position to said generally horizontal position when said seat cushion is in said first position; and a stop pin immovably engaged with the mount assembly and extending laterally away therefrom and a stop surface formed on the seat back for abutting the stop pin when the seat back is in the seating position to thereby prevent moving the seat back away from the generally horizontal position.

18. The seat assembly of claim 17, further comprising a pivot arm coupling the seat cushion to the mount assembly.

19. The seat assembly of claim 18, wherein said seat cushion is oriented generally horizontal in both of said first and second positions.

20. The seat assembly of claim 17, wherein the abutment and stop surfaces establish a bight, and the pins are received in the bight when the seat assembly is in the seating configuration to thereby hold the seat assembly in the seating configuration.

21. The seat assembly of claim 18, further comprising a torque tube engaged with said pivot arm.

\* \* \* \* \*